US006293503B1

(12) United States Patent
Beal (10) Patent No.: US 6,293,503 B1
(45) Date of Patent: Sep. 25, 2001

(54) SPACE LAUNCH SYSTEM WITH PRESSURE REDUCTION DEVICES BETWEEN STAGES

(76) Inventor: D. Andy Beal, 3816 Statford, Highland Park, TX (US) 75205

( * ) Notice: Subject to any disclaimer, the term of this patent is extended or adjusted under 35 U.S.C. 154(b) by 0 days.

(21) Appl. No.: 09/237,759

(22) Filed: Jan. 26, 1999

Related U.S. Application Data

(60) Provisional application No. 60/073,155, filed on Jan. 30, 1998.

(51) Int. Cl.$^7$ ........................................ B64G 1/22
(52) U.S. Cl. ........................................ 244/172; 244/1 R
(58) Field of Search ........................ 244/172, 158 R, 244/1 R, 74, 131; 60/225; 102/337, 338

(56) References Cited

U.S. PATENT DOCUMENTS

| | | | |
|---|---|---|---|
| 3,218,974 | * 11/1965 | Samms . | |
| 3,262,266 | * 7/1966 | Howison . | |
| 3,310,947 | * 3/1967 | Shryock . | |
| 3,650,214 | * 3/1972 | Green . | |
| 4,771,998 | 9/1988 | Rogge et al. | 269/17 |
| 4,901,949 | 2/1990 | Elias | 244/49 |
| 4,939,438 | 7/1990 | Burtzlaff et al. | 318/564 |
| 5,350,137 | * 9/1994 | Henley . | |
| 5,390,606 | 2/1995 | Harris | 102/378 |
| 5,522,569 | 6/1996 | Steffy et al. | 244/158 R |
| 5,535,502 | 7/1996 | Harris | 29/527.1 |
| 5,657,946 | * 8/1997 | Perkins . | |
| 5,743,492 | * 4/1998 | Chan et al. . | |
| 6,042,057 | * 3/2000 | Rice . | |

OTHER PUBLICATIONS

AIAA/SAE/ASME/ASEE 30th Joint Propulsion Conference and Exhibit—"Low Cost Liquid Upper Stage for Small Launch Vehicles" by Daniel Moser & Scott Frazier, Jun. 27–29, 1994.

* cited by examiner

Primary Examiner—Charles T. Jordan
Assistant Examiner—Tien Dinh
(74) Attorney, Agent, or Firm—Jenkens & Gilchrist, P.C.

(57) ABSTRACT

A rocket having first and second stages constructed with a first interstage region located between the first and second stages. The interstage region further includes methods of and apparatus for reducing the pressure therein. In this manner, the reduced pressure may be used to keep the rocket in tact during flight. In one embodiment, a second interstage section is also located between a second and a third stage. The a method of reducing pressure is achieved in one embodiment by using the velocity of air passing the rocket during flight to create a pressure within the interstage regions that is lower than the ambient pressure around the rocket.

1 Claim, 7 Drawing Sheets

SPACE LAUNCH SYSTEM WITH PRESSURE REDUCTION DEVICES BETWEEN STAGES

THIS APPLICATION CLAIMS THE BENEFIT OF PRIOR FILED AND COPENDING U.S. PROVISIONAL APPLICATION NO. 60/073,155, ENTITLED "SPACE LAUNCH SYSTEM", FILED JAN. 30, 1998, NOW PENDING.

BACKGROUND

The present invention relates to space launch systems and, more particularly, but not by way of limitation, to liquid propulsion systems.

Commercial interest in injecting payloads into earth orbit has reached crescendo proportions. The prior art is thus replete with rocket designs of varying degrees of efficiency and/or viability. Most of these designs address a multi-stage launch vehicle. Such vehicles are designed to provide sufficient energy to the payload to reach orbital conditions. Consistent with standard business direction, there is, therefore, mounting pressure to reduce overall launch vehicles costs. A variety of designs have, thus, been implemented to date, which designs include a variety of both solid and liquid propellant systems. These systems are most often incorporated into multiple stage rockets due to the fact that it is more economically efficient to discharge a "booster stage" after it has performed its required task. This step eliminates the weight of the booster portion of the rocket to improve subsequent stage performance.

The designs of liquid propulsion rocket stages have not varied in technical scope as greatly as one might expect. The reason is that the cost to design and develop new liquid propulsion stages is very high. Few companies can afford the "hundreds of millions of dollars" that have been traditionally required to design, develop and build new propulsion systems. For this reason, a variety of propulsion systems have been modified or improved over the years, as described in the International Reference Guide to Space Launch Systems (cite). As referenced in that detailed publication, many nations have become involved in commercially transporting payloads into earth orbit. It has been noted that eight (8) countries have developed and proved their capacity to complete this operation. In spite of this commercial and technological advancement, many problems remain with regard to commercial launch vehicles and conventional propulsion systems. The problems associated therewith relate to weight, cost, reliability, safety, efficiency and simplicity. Modern developments in the material sciences have formed the genesis of certain developments with regard to launch vehicles. It would be an advantage, however, to incorporate modern material technology and other aspects of propulsion systems into an improved system that is more economical to fabricate and more reliable to operate in a configuration that is more cost effective than conventional systems. In this manner, commercial satellites and other payloads could be efficiently injected into earth orbit with more inherent reliability.

The present invention addresses the disadvantages of the prior art rocket systems by incorporating modern material and system engineering to provide a propulsion system capable of the above referenced improved operation. The improved system of the present invention incorporates light weight, and stronger materials in a configuration that facilitates safe, reliable operations in a simplified flow system. The system of the present invention also eliminates many of the complex parameters necessary for cryogenic propulsion systems. For example, heavy steel tanks and expensive hauling equipment for cryogenic materials can be eliminated by utilizing fuels such as kerosene or JT-5 and oxidants such as hydrogen peroxide ($H_2O_2$). The present invention, thus, provides a marked advance over the prior art by utilizing such design aspects.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1A:
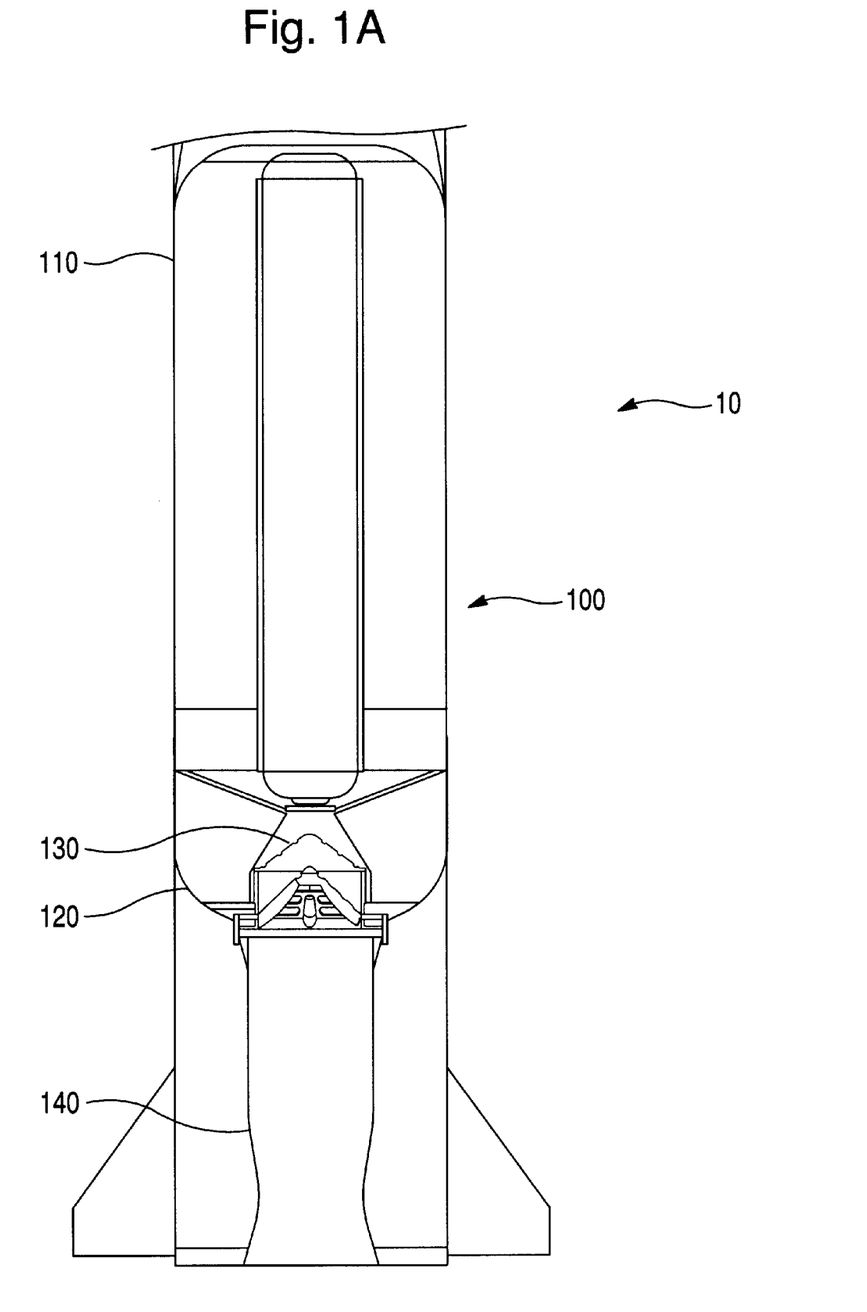
FIGS. 1A, 1B, and 1C are diagrammatic, side elevational cross-sectional views of a rocket constructed in accordance with the principles of the present invention.
Figure 1B:
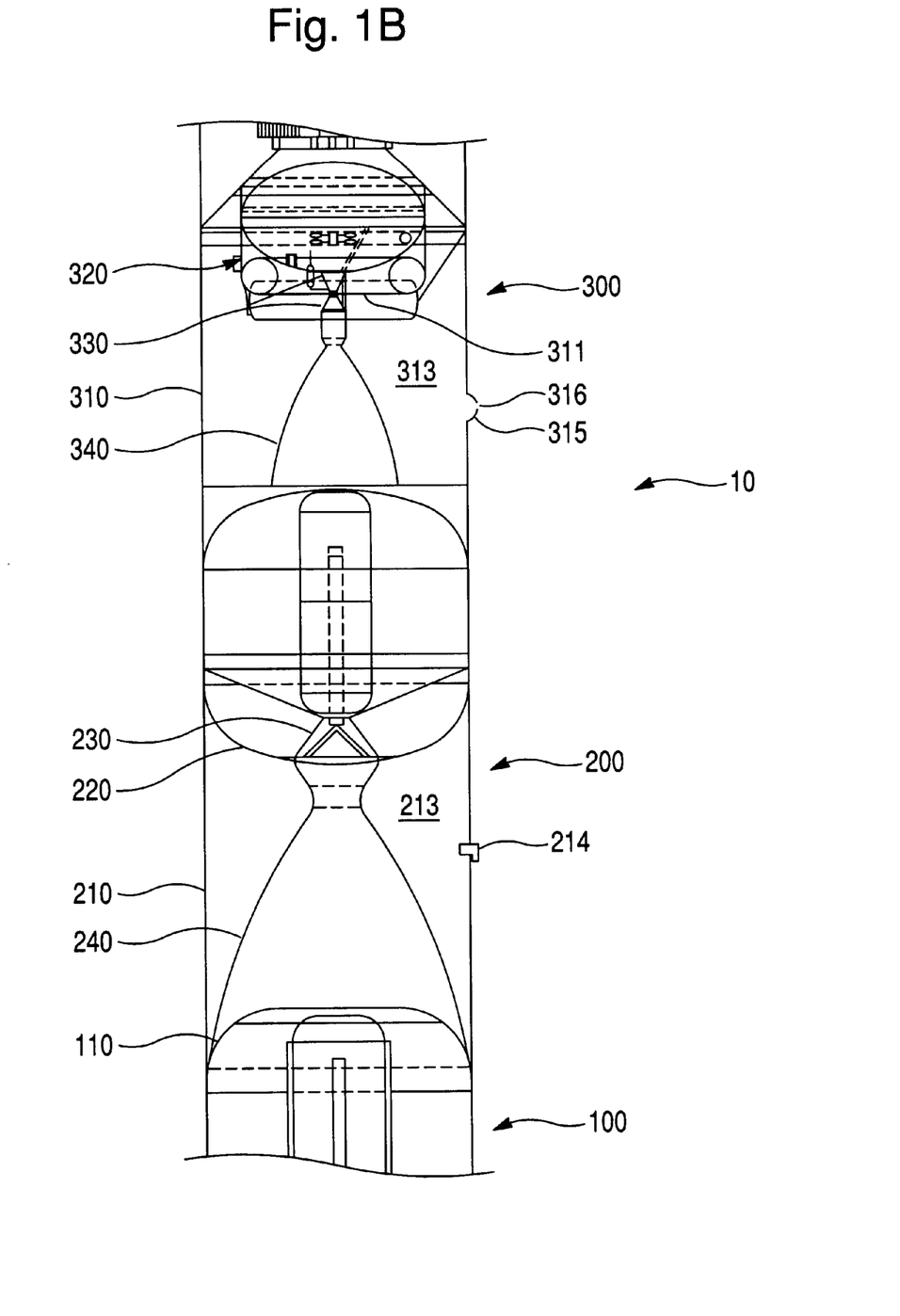
Figure 1C:
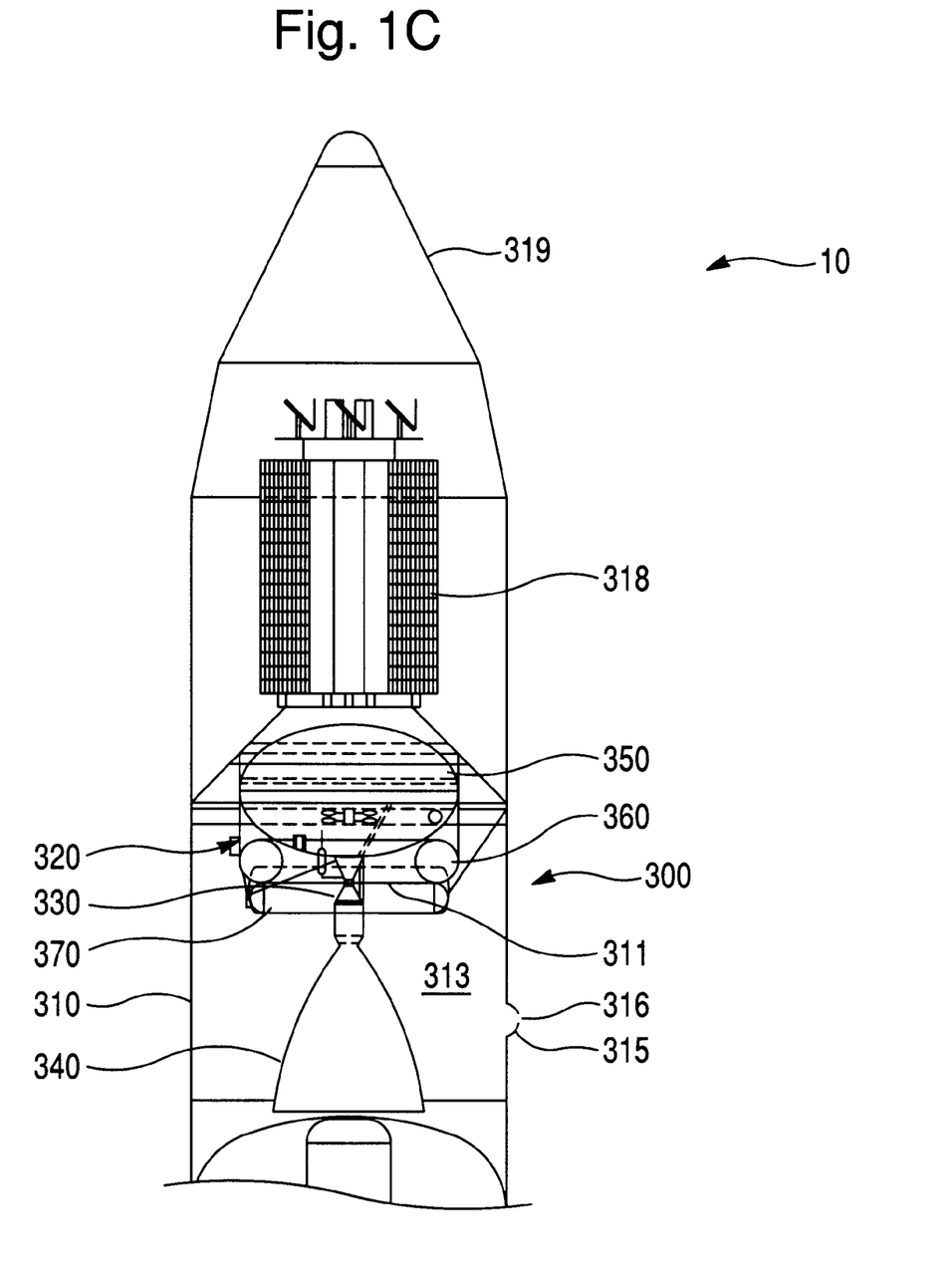

Referring now to FIGS. 1A, 1B, and 1C, there is shown a rocket 10 illustrating an embodiment of the present invention. The rocket 10 generally comprises a first or booster stage 100, a second stage 200, and a third or final stage 300. The booster stage 100 has a cylindrical body 110 with a propulsion tank assembly 120 secured within, an injector assembly 130 secured to the propulsion tank assembly 120, and a nozzle 140 secured to the injector assembly 130. Similarly, the second stage 200 has a cylindrical body 210 with a propulsion tank assembly 220 secured within, an injector assembly 230 secured to the propulsion tank assembly 220, and a nozzle 240 secured to the injector assembly 230. The third stage 300 includes a cylindrical body 310 with a propulsion tank assembly 320 secured therein, a gimbal 311 secured to the cylindrical body 310, an injector assembly 330 secured to the gimbal 311 and connected to the propulsion tank assembly 320, a nozzle 340 secured to the injector assembly 330, a payload 318 secured within the cylindrical body 310, and a nose cone 319 enclosing the payload 318 within the cylindrical body 310.

Passive Pressure Joint

Referring now to FIG. 1B, in one embodiment of the present invention, a reduced pressure between the stages of the rocket 10 is used in keeping the rocket intact during flight. An interstage section 213 is located between the first stage 100 and the second stage 200, and an interstage section 313 is located between the second stage 200 and the third stage 300. The reduced pressure is achieved by using the velocity of air passing the rocket 10 during flight to create a pressure within the interstage sections 213 and 313 that is lower than the ambient pressure.

Still referring to FIG. 1B, in one embodiment the reduced pressure within the interstage section is created by a downwardly facing bleed pipe. A downwardly facing bleed pipe 214 on the exterior of the cylindrical body 210 is coupled with the interstage section 213. Pressure within the interstage section 213 is reduced by the free-streaming air passing over the downwardly facing bleed pipe 214.

Referring still to FIG. 1B, in one embodiment the reduced pressure within the interstage section is created by an opening located in a bulge of the skin of the rocket 10. The cylindrical body 310 has a bulge 315 with an opening 316 to the interstage section 313 located in the highest portion of the bulge 315. The atmosphere rushing over the bulge 315 causes a net negative pressure in the interstage section 313.

Still referring to FIG. 1B, in yet another embodiment, an outwardly facing circumferential flare of the upper stage, relative to the lower stage, with slots in the aft-facing offset, will cause a net negative pressure.

Referring still to FIG. 1B, by sizing the various openings and bulges, the proper pressure reduction can be achieved. Stage separation is achieved via the ignition process of the upper stage. Ignition of the second stage 200 will separate the first stage 100 from the rocket 10, and ignition of the third stage 300 will separate the second stage 200 from the rocket 10. The exhaust products of the upper stage 200, 300, pressurize the interstage section 213, 313, respectively, and simply blow the lower stage 100, 200, from the upper stage 200, 300, respectively. A short overlapped slip joint (or joggle) is used to transmit shear loads through the staging joint. This overlapped region provides a short stroke piston-cylinder which can be tuned (by adding or subtraction the overlap length) to generate the desired separation velocity within physical limits.

Still referring to FIG. 1B, the present invention of the passive pressure joint has the advantage of a reduction in parts and the failures attributed to the operation of the additional parts required by the prior art designs. The prior art staging methods require wiring of pyrotechnic devises into driver circuits, which are in turn wired into the flight sequencer computer. Flight sequence programming errors, hardware failures, and/or installation mistakes in the prior art methods can cause a mission failure. Additionally, the compaction of the joint (and hence, the bending resistance) can be easily tailored to changing requirements in the present invention by changing the size and/or orientation of the venting orifices.

Propulsion Tank Assembly

Figure 2:
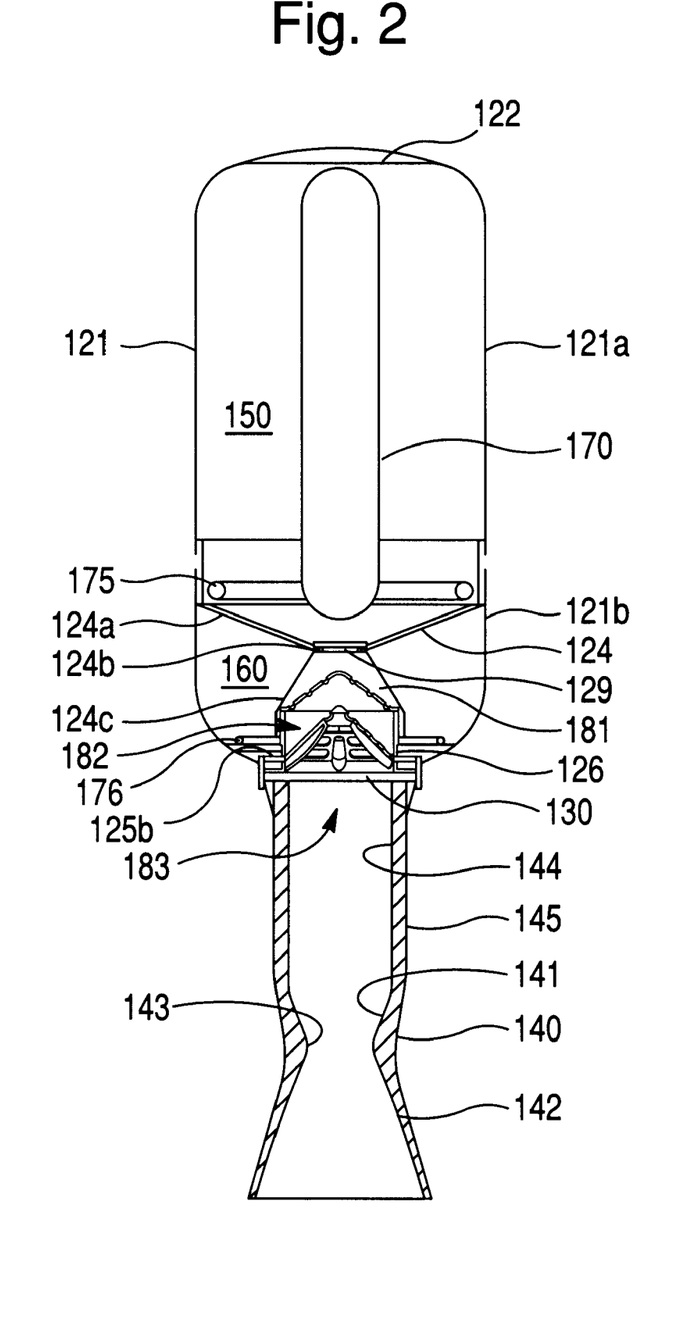
FIG. 2 is a cross-sectional view of the propulsion tank assembly, injector assembly and nozzle from the first stage of the rocket in FIG. 1.

Referring now to FIGS. 1A and 2, the propulsion tank assembly 120 for the first stage 100 generally comprises a propulsion tank outer shell 121, a propulsion tank separation bulkhead 124, a fuel chamber sidewall 126, a drive fluid tank 170, an oxidant bubbler ring 175, and a fuel bubbler ring 176.

The propulsion tank outer shell 121 has a first or upper shell 121a connected to a second or lower shell 121b. The upper shell 121a is preferably formed of a composite material using a synthetic fiber which is wound from an upper shell polar boss 122 into the shape of the upper shell 121a. Similarly, the lower shell 121b is preferably a formed of a composite material using a synthetic fiber which is wound into the shape of the lower shell 121b from an injector polar boss 123.

Referring now to FIG. 2, the propulsion tank separation bulkhead 124 separates the propulsion tank outer shell 121 into an oxidant chamber 150 in the upper portion, and a fuel chamber 160 in the lower portion. The propulsion tank separation bulkhead 124 has an oxidant separation wall 124a with an oxidant orifice 124b therein. The oxidant separation wall 124a forms the lower end of oxidant chamber 150 within the propulsion tank outer shell 121 and the upper end of the fuel chamber 160 within the propulsion tank outer shell 121. The oxidant chamber 150 is formed by the propulsion tank outer shell 121 and the oxidant separation wall 124a of the separation bulkhead 124. An oxidant burst disk 129 is disposed within the oxidant orifice 124b of the propulsion tank separation bulkhead 124. Initially, the oxidant burst is disk 129 prevents the oxidizer in the oxidizer chamber 150 from flowing through the oxidant orifice 124b in the separation bulkhead 124.

Referring still to FIG. 2, the separation bulkhead 124 also has a fuel chamber wall 124c disposed on the opposite side of the oxidant separation wall 124a from the oxidant chamber 150. The fuel chamber side wall 126 extends from the fuel chamber wall 124c of the separation bulkhead 124 to the injector polar boss 123 of the propulsion tank lower shell 121b. The fuel chamber 160 is formed by the propulsion tank outer shell 121, the fuel chamber side wall 126, and the oxidant separation wall 124a and the fuel chamber wall 124c of the propulsion tank separation bulkhead 124.

Still referring to FIG. 2, the drive fluid tank 170 is disposed within the oxidant chamber 150 in the propulsion tank outer shell 121 and coupled to the oxidant bubbler ring 175 and the fuel bubbler ring 176. The oxidant bubbler ring 175 is located in the lower portion of the oxidant chamber 150 and the fuel bubbler ring 176 is located in the lower portion of the fuel chamber 160. The oxidant bubbler ring 175 and the fuel bubbler ring 176 have apertures 175a and 176a, respectively, spaced around the rings that are located forty five degrees (45°) below horizontal and directed towards the side walls of the propulsion tank shell 121.

Referring now to FIGS. 1B and 1C, the propulsion tank assembly 220 for the second stage 200 is the same configuration as the propulsion tank assembly 120 in the first stage 100. The propulsion tank assembly 320 for the third stage 300, however, comprises separate oxidant tank 350, fuel tank 360, and drive fluid tank 370. The oxidant tank 350, fuel tank 360, and drive fluid tank 370 are secured to the cylindrical body 310 in the third stage 300, and the third stage engine with its injector assembly 330 is secured to the gimbal 311 which is secured to the cylindrical body 310 in the third stage 300. The nozzle 340 for the third stage 300 is connected to the injector assembly 330. The flow of oxidant and fuel through the injector assembly 330 in the third stage 300 is controlled by electromechanical actuators (valves).

Injector Polar Boss

Figure 3:
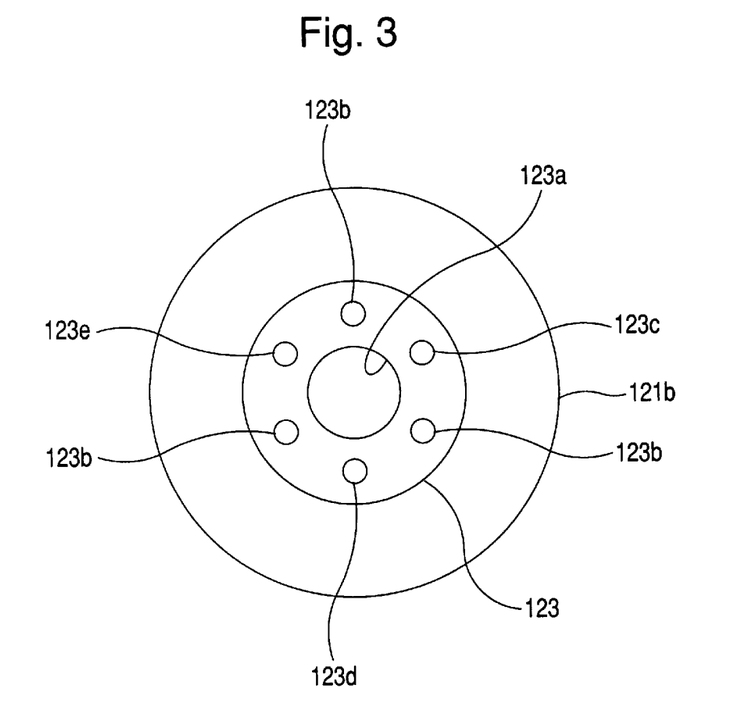
FIG. 3 is a bottom view of the injector polar boss of the propulsion tank assembly shown in FIG. 2.

Referring now to FIGS. 2 and 3, as previously stated, the lower shell 121b of the propulsion tank shell 121 is preferably formed of a composite material using a synthetic fiber which is wound from the injector polar boss 123. The injector boss 123 includes an injector assembly aperture 123a in which the injector assembly 130 is mounted. The injector polar boss 123 also includes a plurality of boss fuel apertures 123b which are located in the fuel chamber 150. The injector polar boss 123 also includes an oxidant feed port 123c, a fuel feed port 123d, and a drive fluid feed port 123e.

Referring now to FIGS. 1A–C, 2, and 3, the injector polar boss 123 serves to provide both as the polar boss for the lower shell 121b of the propulsion tank shell 121 and as the embedded mount for the injector assembly 130 of the engine. The second stage 200 of the rocket 10 includes the same configuration of the injector polar boss on the propulsion tank shell of the propulsion tank assembly 220. Polar bosses for composite tanks keep the wound fibers from building up to thickly at the end of the tanks by causing the point at which the wound fibers reverse to occur at a finite distance from the centerline of the tank. The use in the present invention of the polar boss for both the tank boss and the engine mount simplifies the structural load path between the compressive loads introduced by the engine and the tension loads inherent in the pressurized propulsion tank. The design of the present invention eliminates thrust structures, valves, feed lines, and creates a lighter, simpler, and more reliable means of primary propulsion for booster rocket stages. The design of the present invention also avoids a concentration of compressive thrust loads and subsequent redistribution to the tank structure, and provides for a more compact (in length) propulsion system.

Injector Assembly

Referring now to FIGS. 4 and 5A–D, the injector assembly 130 generally includes an injector assembly base ring 131, an injector chamber cone 132, injector tubes 133, a catalyst chamber sidewall 134, and a catalyst retainer wall 135.

Still referring to FIGS. 4 and 5A–D, the injector base ring 131 has a mounting surface 131a located about a central injector chamber opening 131b. An oxidant feed passage 131c in the base ring 131 communicates between an external oxidant feed line 136a and an internal oxidant feed line 136b via the oxidant feed port 123c in the-injector polar boss 123. The internal oxidant feed line 136b is in communication with the oxidant chamber 150. A fuel feed passage 131d in the base ring 131 communicates between an external fuel feed line 137 and the fuel chamber 160 via the fuel feed port 123d in the injector polar boss 123. A drive fluid feed passage 131e in the base ring 131 communicates between an external drive fluid feed line 138a and an internal drive fluid feed line 138b via the drive fluid feed port 123e in the injector polar boss 123. The internal drive fluid feed line 138b is in communication with the drive fluid tank 170.

Referring still to FIGS. 4 and 5A–D, base ring fuel passages 131f in the base ring 131 communicate between the boss fuel apertures 123b in the injector polar boss 123 and base ring fuel apertures 131g in the central injector chamber opening 131b. Fuel burst disks 139 are disposed between the boss fuel apertures 123b in the injector polar boss 123 and the base ring fuel passages 131f of the base ring 131. Initially, the fuel burst disks 139 prevent the flow of fuel in the fuel chamber 160 into the base ring fuel passages 131f of the injector assembly 130.

Figure 4:
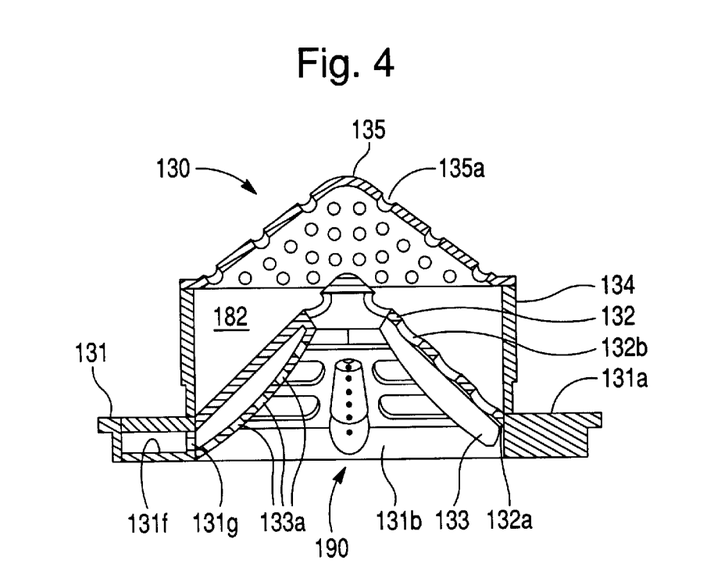
FIG. 4 is perspective view of the injector assembly from FIG. 2.
Figure 5A:
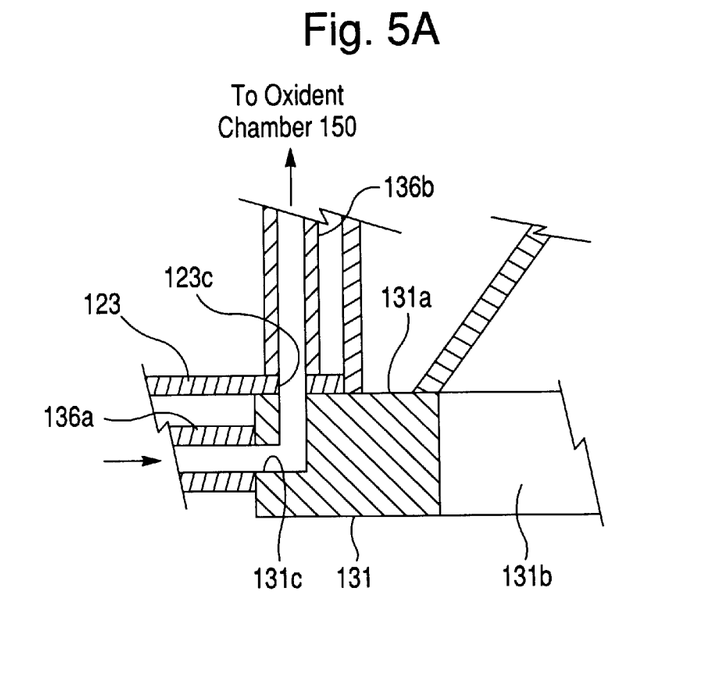
FIGS. 5A–D are sectional views of portions of injector assembly mounted to the injector polar boss illustrating the oxidant feed passage, the fuel feed passage, the drive fluid passage, and the fuel supply chamber, respectively, of the injector base ring assembly from FIGS. 2 and 4.
Figure 5B:
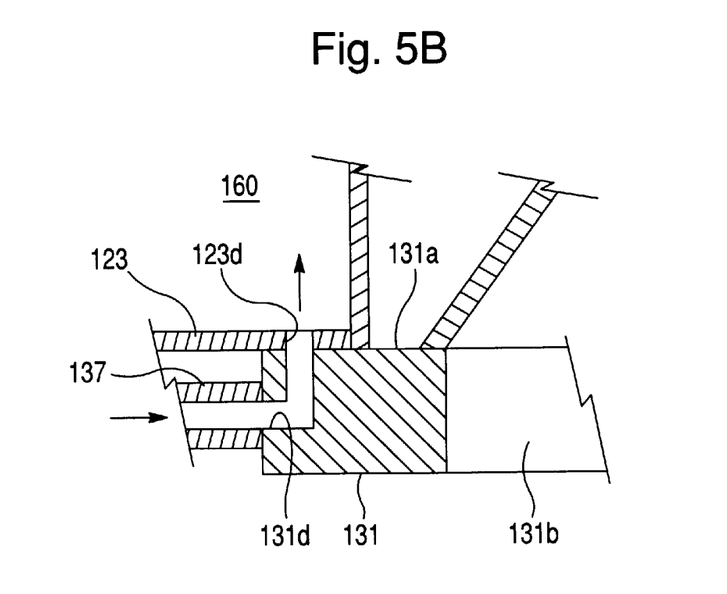
Figure 5C:
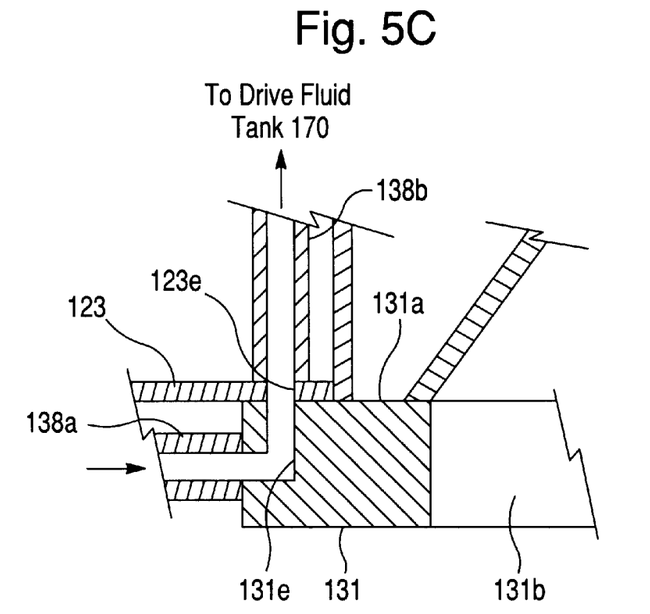
Figure 5D:
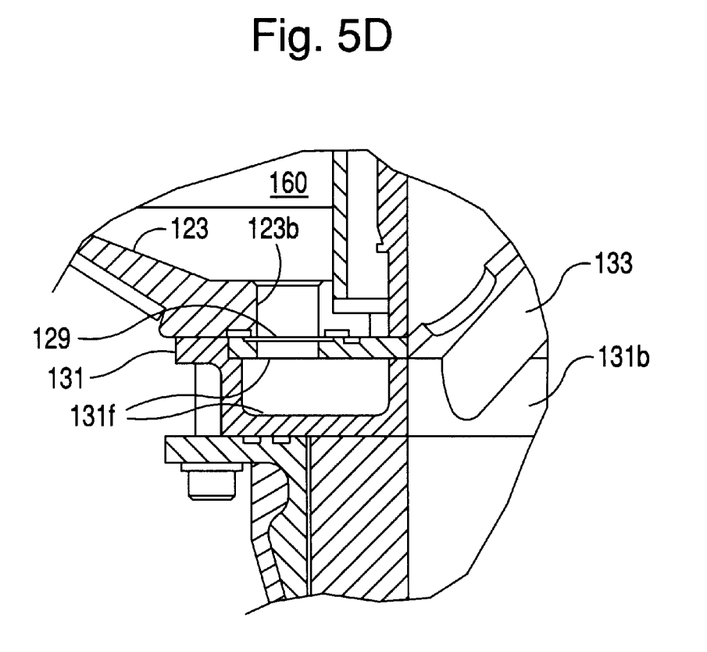

Referring now to FIG. 4, the injector chamber cone 132 has a cone base 132a that is open and secured to the injector assembly base ring 131, over the central injection chamber opening 131b. The injector chamber cone 132 also includes oxidant ports 132b. The catalyst chamber sidewall 134 is a cylindrical member extending upwardly from the injector base ring 131 around the injector cone 132. The catalyst retainer wall 135 is a conical member having catalyst retainer wall apertures 135a and is secured to the catalyst chamber sidewall 134 above the injector chamber cone 132. The combination of the injector chamber cone 132, catalyst chamber sidewall 134, and catalyst retainer wall 135 forms a catalyst bed or catalyst reaction chamber 182.

Still referring to FIG. 4, the catalyst reaction chamber 182 is a conical shape due to the conical nature of the injector cone 132 and the catalyst retainer wall 135. Although the catalyst reaction chamber 182 is a conical shape, the catalyst reaction chamber 182 can be hemispherical, arched, domed, vaulted, or the like. The conical shape of the injector chamber cone 132 is substantially more efficient at carrying the pressure load which is created across the catalyst reaction chamber 182 than a traditional flat plate. The span of a flat plate forming a catalyst reaction chamber for the same surface area of a catalyst, would generate forces on the flat plate which would cause the flat plate to be very heavy and expensive. In contrast, the conical shape of the injector chamber cone 132 will support greater forces due to the pressure load on the catalyst bed, than would an ordinary flat plate. Although a hemispherical shape is most efficient from a stress standpoint at supporting the pressure load created across the injector cone 132, a conical shape of the injector chamber cone 132 can be manufactured at a lower cost. The conical shape of the injector chamber cone 132 subjects the injector chamber cone to compressive forces, and therefore buckling must be considered in the manufacture of the injector chamber cone 132.

Referring still to FIG. 4, the conical shape of the catalyst reaction chamber 182 improves the surface area available of a catalyst for a given chamber diameter. By reducing the chamber diameter, the mass of the injector chamber can be reduced, and the ratio of injector area to throat diameter is improved. Although the manufacturing of a catalyst bed is harder for a cone than a flat plate, manufacture of a cone is much easier than a hemisphere.

Still referring to FIG. 4, the fuel injector manifolds 133 extend upwardly and radially inward from the injector base ring 131 along the injector chamber cone 132 with in an injection chamber 183 is formed below the injector chamber cone 132. Each of the fuel injector manifolds 133 are in fluid communication with at least one of the base ring fuel passages 131f in the injector assembly base ring 131 via at least one of the base ring fuel apertures 131g extending from the base ring fuel passages 131f to the injector manifolds 133. The fuel injector manifolds 133 each have a plurality of injection orifices 133a facing the injection chamber 183.

Referring still to FIG. 4, the goal of a fuel delivery system is to deliver the fuel in volumetric proportion to the oxidizer. The upward and inward projection of the fuel injector manifolds 133, and the associated injector assembly apertures 133a provide fuel in volumetric proportion to the oxidizer passing through the oxidizer ports in the injector chamber cone, that is a relatively constant volumetric proportion in both the axial and radial direction of the injector chamber 183. The radial feed tubes 133 allow fuel spray patterns which can be very similar for all size engines. The localized mixing of the fuel into the flow of the oxidizer gas can be made very similar for each size engine. The distance between the fuel tubes, the flow speeds of the gas and fuel streams, and the eddies associated with edges of the oxidizer exit ports can all be very similar in most size engines. Since the thrust of the engine increases with the area of the injector face 132, but the fuel manifold area at the root of the tubes only increase with the circumference of the injector face, the geometry and number of fuel tubes change with engine size. By keeping the fuel tubes approximately the same diameter, then more tubes are required with closer angular (azimuthal) spacing as engine size increases. The use of constant oxidizer hole size and spacing and fuel tube diameter and spray pattern provides similar mixing characteristics regardless of injector diameter and hence engine thrust.

Still referring to FIG. 4, the conical shape of the injector chamber cone 132 provides additional volume for the injection/combustion chamber 183. The additional volume of the injection/combustion chamber 183 reduces the length of the required combustion chamber. A reduction in the length of the combustion chamber will reduce the cost and weight of the rocket engine. Also, the conical shape of the injector chamber cone 132 eliminates right angles between the injector face and the combustion chamber walls, and prohibits the injector from being co-planer with the combustion chamber walls. The elimination of right angles between the injector face and the combustion chamber walls, and the prevention of the injector face from being coplanar with the combustion chamber walls, prevents pressure waves from reflecting off a side wall and propagating back across the injector face. Any transverse pressure waves in the injector 130 would tend to be reflected into the axial direction, which has no symmetrical reflector either. Additionally, the selection and number of fuel injection manifolds 133 and the lengths of the fuel injection manifolds 133 is such that there is no bi-symmetry on the injector face (that is, no dividing plane through the center of the engine has identical halves on each side of the plane). The elimination of bi-symmetry on the injector face minimizes the ability of pressure waves reflecting and amplifying across the face of the injector assembly 130.

Referring now to FIGS. 2 and 4, the injector assembly 130 is secured within the injector assembly aperture 123a of the injector boss 123. An oxidant manifold 181 is formed prior to the catalyst reaction chamber 182 by the fuel chamber wall 124c and the fuel chamber sidewall 126 of the propulsion tank assembly 120, and the catalyst chamber sidewall 134 and the catalyst retainer wall 135 of the injector assembly 130. The injection chamber 183 is created within the injector chamber cone 132 and the injector chamber center opening 131a of the injector base ring 131. The nozzle 140 is connected to the injector base ring 131 of the injector assembly 130 below the injection chamber 183.

Referring now to FIGS. 1B and C, the injector assembly 230 for the second stage 200 is the same configuration as the injector assembly 130 of the first stage 100. The injector assembly 330 of the third stage 300 is similar to the injector assembly 130 of the first stage 100, however, the injector assembly 330 of the third stage has been modified to be mounted on the gimbal 311 in place of a polar boss. Modifications that make up the injector assembly 330 include an oxidant manifold housing to form the oxidant manifold over the catalyst retainer wall, and the oxidant and fuel being supplied by lines from the respective oxidant tank and fuel tank.

Ablative Thrust Chamber

As best shown in FIG. 2, the first stage nozzle 140 has a convergent portion 141 and divergent portion 142 interconnected by a throat portion 143, and a combustion chamber portion 144. In the preferred embodiment, the first stage nozzle 140 has an ablative construction that provides a self-cooled combustion chamber/nozzle that converts the high-pressure, high-temperature rocket propellant gaseous combustion products into a propulsive force (thrust). Ablative materials are advantageously used in the construction of the nozzle 140 because they are capable of providing self-cooling as they are ablated, or sacrificed, at a designed rate for a relatively short period of time.

The converging nozzle portion 141 and throat portion 143 are formed of a low viscosity, acid-catalyzed phenolic resin and a stack of high silica, i.e., about 98% $SiO_2$, fiberglass cloth plies that are applied to a preshaped mold surface. The silica cloth plies are saturated with phenolic resin and assembled by hand lamination, resin transfer molding, or other common manufacturing practice. The resin-impregnated plies are then compacted by a press and heat cured to obtain a high-density laminated structure with the plane of the lamination being roughly perpendicular to the axis of the convergent portion 141. The final desired dimensions and nozzle contours of the throat region 143 may be obtained or refined by machining the laminated structure.

The divergent portion 142 of the first stage nozzle 140 is formed by applying long, narrow strips of silica cloth to a mandrel while being saturated with the low viscosity, acid-catalyzed phenolic resin. In this construction, the saturation may be easily accomplished by hand lamination or with the aid of a roller-type resin inpregnator. The silica strips are desirably first applied to the small end of the mandrel, where it is in contact with the machined throat area formed in the above-described construction step. Bias-cut strips allow the material to conform into a narrow notch at the small end of the divergent nozzle portion 142.

Preferably, a tensioned yarn of carbon fiber is then used to aid in the compaction of the bias-cut strips until there is an adequately wide area to apply warp-oriented (slit along the length of the fabric roll) strips. All of the strips are impregnated with phenolic resin and wound onto the mandrel with slight tension as the mandrel is rotated. The fabric laminant thus "climbs up" the divergent nozzle mandrel until all of the material has been applied. While still rotating, the laminant is heat cured, either alone or along with the convergent portion 141 and throat region 143.

The combustion chamber portion 144 is formed by applying long narrow strips of bias-cut strips of the silica cloth to a generally cylindrical combustion chamber mandrel while being saturated with a low viscosity acid-catalyzed phenolic resin. In one embodiment, the silica strips are relatively narrow at the injector end of the combustion chamber portion 144 and then become progressively wider as the angular orientation of the plies to the chamber axis progresses from an initial 45° bias angle to a half-angle of 10°. The silica strips are applied in this fashion up to the previously fabricated convergent portion 145 and machined throat area 143 of the first stage nozzle 140. A tensioned yarn of carbon fiber is desirably wound over the laminant with a spacing of approximately 1 cm, to aid in the compaction of the laminant structure while allowing excess resin to be removed. Compaction pressures may also be further enhanced by forming the mandrels of materials which have a high thermal expansion rate, i.e., polyethylene. While rotating the laminant, the structure is heat cured either alone or with the convergent and divergent nozzle sections 141, 142 and machine throat area 143.

The above-described nozzle assembly is then externally machined and bonded to an attachment ring 145 and is sealed with a compliant layer, i.e., a toughened epoxy or polyurethane. The bonded and sealed assembly is then installed in a filament winding machine and over wrapped with carbon-epoxy filaments. The attachment ring 145, combustion chamber portion 144, converging nozzle portion 141, the throat area 143, and diverging nozzle portion 142, of the ablative nozzle 140 are enclosed within the filament wound layers, essentially integrating them into a single composite structure.

System Operation

Referring now to FIGS. 1A–C, 2, 3, 4, and 5A–D, the oxidant chambers 150, 250, and 370, are filled through the oxidant feed lines with an oxidant 30, such as hydrogen peroxide ($H_2O_2$), or the like. Similarly, the fuel chambers 160, 260, and 360, are filled through the fuel feed lines with a fuel 60 such as kerosene, JP-5, or the like. Also, the drive fluid tanks 170, 270, and 370 are filled through the drive fluid feed lines with a drive gas or fluid 20. The drive gas is preferably a fluid in the liquid state which will change to a vapor state at relatively low temperatures and will not react with the oxidant 30 or fuel 60. In one embodiment the drive gas 20 is helium, however, other drive gases such as nitrogen could also be used. A catalyst 40, such as layers of silver coated screens, are disposed within the catalyst beds of the injector assemblies 130, 230, 330.

Referring now to FIGS. 1A and 2, the flow of oxidant 30 and fuel 60 from the propulsion tank assembly 120 through the injector assembly 130 initiated by opening the drive fluid tank 170 to the oxidant chamber 150 and the fuel chamber 160, and pressurizing the oxidant chamber 150 and the fuel chamber 160 to a point where the burst disks 129 and 139 burst. The flow of oxidant 30 and fuel 60 through the first stage 100 is driven by the pressure within the oxidant chamber 150 and the fuel chamber 160, which is enhanced by pressure from the drive fluid tank 170. The drive gas 20 is supplied from the drive fluid tank 170 to the oxidant bubbler ring 175 and the fuel bubbler ring 176. Once the oxidant burst disk 139 and the fuel burst disks 139 are ruptured, the engine will burn without interruption until the oxidant 30 and fuel 60 are expended.

Referring still to FIGS. 1A and 2, the drive gas 20 is dispersed in the oxidant chamber 150 and the fuel chamber 160 through the bubbler ring apertures 175a and 176b in the bubbler ring 175 and 176, respectively. As the drive gas 20 travels upwardly from the bubbler rings 176 and 175, the drive gas 20 absorbs heat from the oxidant 30 and the fuel 60, causing the drive fluid to expand at constant pressure thereby reducing the drive gas density and therefore requiring less drive gas to fill a given volume. In the gaseous state, the drive gas 20 occupies more space within the oxidant chamber 150 and fuel chamber 160 than would be occupied when the drive gas 20 first released into the tank via the bubbler ring, 175, 176.

Referring now to FIGS. 2, 3, 4, and 5D, the pressures within the fuel chamber 160 force the fuel 60 through the boss fuel apertures 123b in the injector boss 123 and into the fuel passages 131f of the injector base ring 131. The fuel 60 in the fuel passages 131f of the injector base ring 131 passes through the base ring fuel apertures 131g into the injector manifolds 133. The injector manifolds 133 distribute the fuel 60 into the injection chamber 183 through the injection orifices 133a.

Still referring to FIGS. 2, 3, 4, and 5D, the pressure of the oxidant 30 and the drive gas 20 within the oxidant chamber 150 forces the oxidant 30 to flow through the oxidant aperture 124b in the separation bulkhead 124 into the oxidant manifold 181. The oxidant 30 in the oxidant manifold chamber 181 flows through the catalyst retainer wall apertures 135a in the catalyst retainer wall 135 into the catalyst reaction chamber 182. The catalyst 40 causes the oxidant 30 to react and generate oxygen ($O_2$) for later reaction with the fuel 60 and water ($H_2O$). The reaction of the oxidant 30 with the catalyst 40 causes an exothermic reaction which drastically heats the oxidant/catalyst reaction products 50. The oxidant/catalyst reaction products 50 exit the catalyst reaction chamber 182 through the injector cone oxidant ports 132b. The oxidant/catalyst reaction products 50 mix with fuel 60 from the injection orifices 133a of the fuel injector manifolds 133, and the heat of the oxidant/catalyst reaction products 50 causes the fuel 60 to combust with the oxygen in the oxidant/catalyst reaction products 50.

Referring now to FIGS. 2 and 4, the conical shape of the injection chamber cone 132 causes the injection chamber 183 to be a conical shape. The injector cone oxidant ports 132b in the injector chamber cone 132 and the injection orifice 133a in the injector manifolds 133 are sized to create the same mixture of fuel 60 to oxidant 30 at the cone base 132a of the injector chamber cone 132 as at the top of the injection chamber 183. The oxidant/catalyst reaction products 50 entering the injection chamber 183 contain sufficient heat that the fuel 60 injected into the injection chamber 183 spontaneously combusts with the oxidant/catalyst reaction products 50. The combustion gases and products 70 from the injection chamber 183 exit the rocket 10 through the nozzle 140.

Referring now to FIGS. 1A and 1B, once the oxidant 30 and fuel 60 in the first stage 100 of the rocket 10 are expended, the drive tank 270 in the second stage 200 is opened up to the oxidant chamber 250 and the fuel chamber 260, and the oxidant chamber 250 and the fuel chamber 260 are pressurized to the point where the oxidant burst disks and the fuel burst disks in the second stage are ruptured. The flow of oxidant 30 and fuel 60 through the second stage 200 is also driven by the pressure within the oxidant chamber 250 and the fuel chamber 260, which is enhanced by the pressure from the drive gas tank 270. When the oxidant 30 and the fuel 60 begin to flow through the injector assembly 230, the engine of the second stage 200 ignites which pressurizes the interstage section 213 and separates the first stage 100 from the second stage 200. The engine of the second stage 200 operates in the same manner as the engine in the first stage 100, and once operation of the engine in the second stage 200 begins, it will burn without interruption until the oxidant 30 and fuel 60 in the second stage 200 are expended.

Referring now to FIGS. 1B and 1C, valves in the third stage 300 control the flow of drive gas 20 to the oxidant tank 350 and the fuel tank 360, and control the flow of oxidant 30 and fuel 60 from the oxidant tank 350 and the fuel tank 360 to the injector assembly 330. Once the oxidant 30 and the fuel 60 in the second stage 200 are expended, the electromechanical actuators cause oxidant 30 and fuel 60 to flow to the injector 330, thereby igniting the engine for the third stage 300 and pressurizing the interstage section 313. When the interstage section 313 is sufficiently pressurized, the second section 200 of the rocket 10 separates from the third stage 300 of the rocket 10, and the engine of the third stage 300 of the rocket carries the payload 318 to a final destination.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

I claim:

1. A rocket comprising:

a first stage;

a second stage;

a third stage;

wherein a first interstate region is located between the first stage and the second stage, and a second interstage region is located between the second and third stages;

means for reducing the pressure within said first interstage region, including means utilizing the velocity of air passing the rocket during flight to create a pressure within said interstage regions that is lower than ambient pressure;

means for reducing the pressure within the second interstage region, including means utilizing the velocity of air passing the rocket during flight to create a pressure within said interstage regions that is lower than ambient pressure; and wherein said pressure reducing means comprises at least one downwardly facing bleed pipe coupled to at least one of said interstage regions.

* * * * *

UNITED STATES PATENT AND TRADEMARK OFFICE
CERTIFICATE OF CORRECTION

PATENT NO. : 6,293,503 B1  
DATED : September 25, 2001  
INVENTOR(S) : D. Andy Beal Page 1 of 1

It is certified that error appears in the above-identified patent and that said Letters Patent is hereby corrected as shown below:

Title page,  
Item [57], ABSTRACT, line 8, replace "a method" with -- method --

Column 4,  
Line 3, replace "burst is" with -- burst --  
Line 40, replace "electromechanical" with -- electro-mechanical --

Column 10,  
Line 49, replace "interstate" with -- interstage --

Signed and Sealed this

Thirtieth Day of April, 2002

*Attest:*

*Attesting Officer*

JAMES E. ROGAN  
*Director of the United States Patent and Trademark Office*